United States Patent

Reed

[15] 3,643,325

[45] Feb. 22, 1972

[54] METHOD OF HYDROSTATICALLY FORMING A TUNNEL STRUCTURE FOR A MAGNETIC PLATED WIRE MEMORY ARRAY

[72] Inventor: Clyde E. Reed, W. St. Paul, Minn.

[73] Assignee: Sperry Rand Corporation, New York, N.Y.

[22] Filed: Mar. 19, 1970

[21] Appl. No.: 20,986

[52] U.S. Cl. ....................29/604

[51] Int. Cl. ....................H01f 7/06

[58] Field of Search ....................29/604

[56] References Cited

UNITED STATES PATENTS 3,465,432 9/1969 Crimmins et al ....................29/604

2,266,349 12/1941 Wempe ....................29/604 X 3,465,308 9/1969 Sakaki et al ....................29/604 X

*Primary Examiner*—Granville Y. Custer, Jr.

*Attorney*—Kenneth T. Grace, Thomas J. Nikolai and John P. Dority

[57] ABSTRACT

A method of using hydrostatic pressure to form copper word lines and/or a copper ground plane about parallel-aligned forming wires to form a plated wire tunnel structure. The copper word lines and the adhesively coated opposing faces of the plastic films to which they are bonded are firmly and compressively formed about the forming wires with the interstitial portions of such plastic films brought into contact to form one physical structure. After curing, the forming wires are removed from the sandwiched construction forming the tunnels into which respectively associated plated wire memory elements are inserted.

3 Claims, 5 Drawing Figures

INVENTOR
CLYDE E. REED

BY Kenneth T. Grace
ATTORNEY

INVENTOR
CLYDE E. REED

BY Kenneth T. Grace
ATTORNEY

METHOD OF HYDROSTATICALLY FORMING A TUNNEL STRUCTURE FOR A MAGNETIC PLATED WIRE MEMORY ARRAY

BACKGROUND OF THE INVENTION

The present invention relates generally to magnetic memory arrays for data processing equipment and in particular to tunnel structures for plated wire memory arrays. Such plated wire memory arrays generally include a plurality of parallel-aligned plated wires, each of a beryllium-copper base of 0.0050-inch diameter with a coating of 81 percent Ni–19 percent Fe, that are inductively coupled to a plurality of parallel-aligned copper word lines, each of which are 0.0014 inch thick, 0.035 inch wide, and spaced on 0.050 centerlines; these word lines are orthogonally oriented with respect to the sandwiched plated wire bit lines. A coincident coupling of the desired drive current amplitude of a first or of a second and opposite polarity to the selected plated wire bit lines and of the desired drive current amplitude of a first polarity to the selected word line sets the magnetization of the selected plated wire bit lines in a first or a second and opposite circumferential direction representative of the storing of a binary 1 or 0 at the plated wire bit line, word line intersection-forming-memory-elements. Coupling of the desired drive current amplitude of a first polarity to the one selected word line induces in the associated plated wire bit lines signals indicative of the information content of the respectively associated memory elements.

Packaging of the plated wire memory array generally consists of a base material having a plurality of parallel arranged holes or tunnels therethrough in which are passed the plated wire bit lines which, in turn, are enveloped by the plurality of parallel arranged word lines which are orthogonally oriented with respect to the bit lines. The bit lines are loosely constrained by the tunnels, thus imparting no stress inducing magnetic effects on the plated wire, while achieving the desired bit line, word line orientation. Some typical plated wire tunnel structures are exemplified by the Sasaki et al. U.S. Pat. No. 3,465,308 and the Maeda U.S. Pat. No. 3,460,113.

SUMMARY OF THE INVENTION

The novel concept of the present invention is the use of hydrostatic pressure to deform the main component parts of a to-be-formed tunnel structure. This novel concept requires the use of some type of tool to contain the pressurizing fluid. This tool is or becomes in use a pressure vessel of some sort. The pressuring medium may be water, oil, hydraulic fluid, or some other material such as polyethylene plastic film, which is or becomes a fluid at the temperature at which deformation takes place. The type of pressure vessel used is optional. The essence of the process is that the pressurizing fluid acts hydrostatically (exerting equal pressure in all directions) and in particular, exerts equal pressure against the deformable tunnel structure components, and maintains that deformation until the tunnel structure has been formed permanently.

The present invention is directed toward a method of hydrostatically forming a plated wire tunnel structure in a pressure vessel. The method broadly consists of: sandwiching a plurality of parallel-aligned forming wires, of a diameter larger than the to-be-used plated wire bit lines, between two word line supporting insulative bases that have their opposing surfaces treated with a suitable adhesive; hydrostatically bringing the interstitial, between the forming wires, portions of the insulative bases into contact; compressively causing the adhesive on the insulative bases to form around the forming wires; curing the adhesive on the insulative bases; forming an integral structure of the insulative bases about the forming wires at their interstitial portions; withdrawing the forming wires from the so-formed tunnels; trimming the so-formed tunnel structure to size; and inserting the plated wires in the so-formed tunnels of the tunnel structure.

DESCRIPTION OF THE PREFERRED EMBODIMENTS

Figure 1:
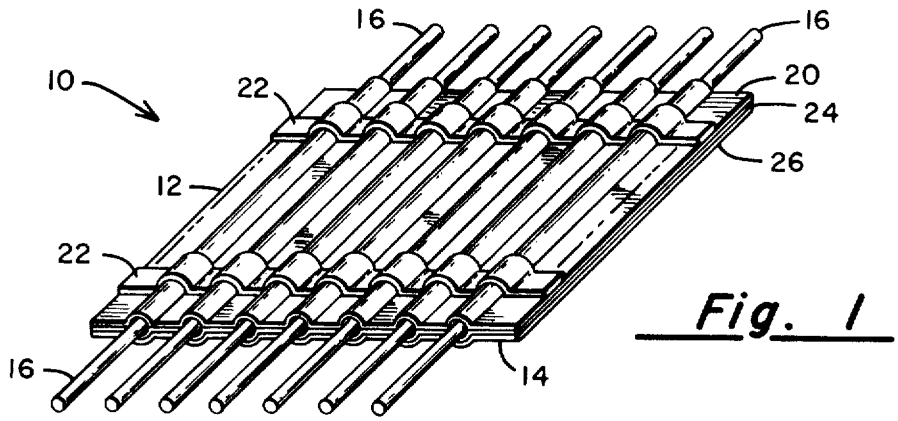
FIG. 1 is a trimetric view of a plated wire memory array fabricated in accordance with the present invention.

With particular reference to FIG. 1 there is presented a trimetric view of a preferred embodiment of a plated wire memory array incorporating the tunnel structure proposed by the present invention. Array 10 is comprised of an integral tunnel structure formed by printed circuit members 12, 14 adhesively forming a tunnel structure in the tunnels of which a plurality of plated wire bit lines 16 are loosely constrained. Printed circuit member 12 is preferably comprised of a polyimide film such as a Kapton H-film 20 having a plurality of copper conductors 22 formed by well-known methods, while printed circuit member 14 is preferably comprised of a Kapton film 24, having a copper ground plane affixed thereto. The Kapton films 20, 24 are preferably of 0.0005 inch thick but may be of any suitable insulative material and thickness while the conductive layers thereon are preferably of 1-ounce copper (0.0014 inch thick) sheet affixed thereto. The so-formed tunnel structure maintains the desired inductive relationship between the plated wire bit lines 16 and the enveloping conductive word lines 22 and ground plane 26.

Figure 2:
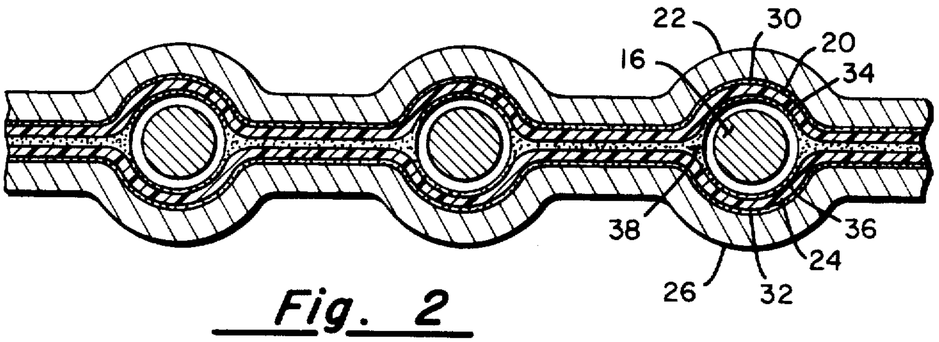
FIG. 2 is a cross-sectional view of the memory array of FIG. 1 taken normal to the plated wire bit lines.

With particular reference to FIG. 2 there is presented a cross-sectional view of array 10, taken normal to the plated wire bit lines 16, for showing in greater detail the cross-sectional conformation of the so-formed tunnel structure. The tunnel structure includes printed circuit members 12, 14: printed circuit member 12 is comprised of Kapton film 20 upon which copper conductors 22 are affixed thereto by a suitable adhesive 30 such as Hysol Adhesive AS–7–2094 manufactured by Hysol Corp., Olean, N.Y.; printed circuit member 14 is comprised of Kapton film 24 upon which copper ground plane 26 is affixed thereto by a suitable adhesive 32 such as Hysol. The Kapton films 20, 24 have their opposing faces treated with a suitable adhesive 34, 36, such as Hysol to a thickness in the order of 0.00025–0.00045 inch. The hydrostatic forming process compressively and thermally forces the printed circuit members 12, 14 to conform to the contour of the forming wires 18 not illustrated in FIGS. 1, 2 of a 0.0070-inch diameter causing the Hysol adhesive 34, 36 to flow about the forming wires 18 filling the gaps 38 between printed circuit members 12, 14 and the forming wires 18. The resulting tunnel structure provides a smooth internal surface with a 0.0010-inch tunnel clearance with the plated wire bit lines 16.

Figure 3:
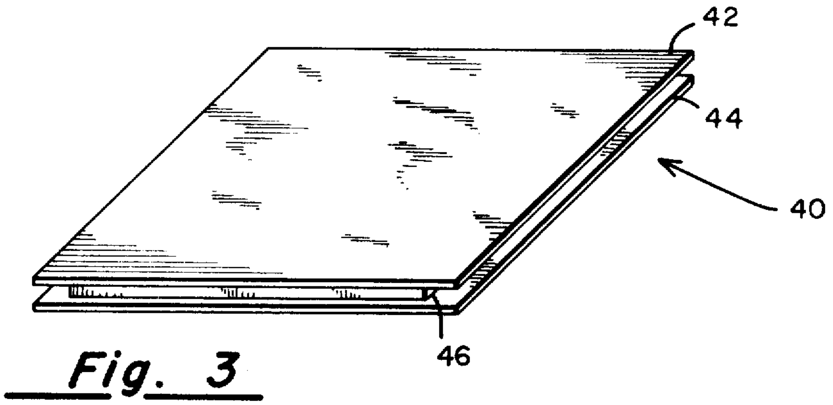
FIG. 3 is a trimetric view of a hydrostatic pad utilized by the present invention.

With particular reference to FIG. 3, there is presented a trimetric view of a preferred embodiment of a hydrostatic pad 40 that may be utilized by the present invention. Hydrostatic pad 40 is comprised of two Kapton film layers 42, 44 of 0.0010 inch thickness and a thermoplastic material 46, of a suitable material to flow in a liquid form at the hydrostatic pressure utilized such as a 0.0040-inch-thick polyethylene sheet that melts at approximately 275° F. The Kapton film layers 42, 44 are preferably sealed at their edges to completely enclose thermoplastic material 46, although such is not required. The planar dimensions of hydrostatic pad 40 should be of sufficient magnitude to completely cover the outermost limits of the forming wires 18, at least in the areas of printed circuit members 12, 14.

Figure 4:
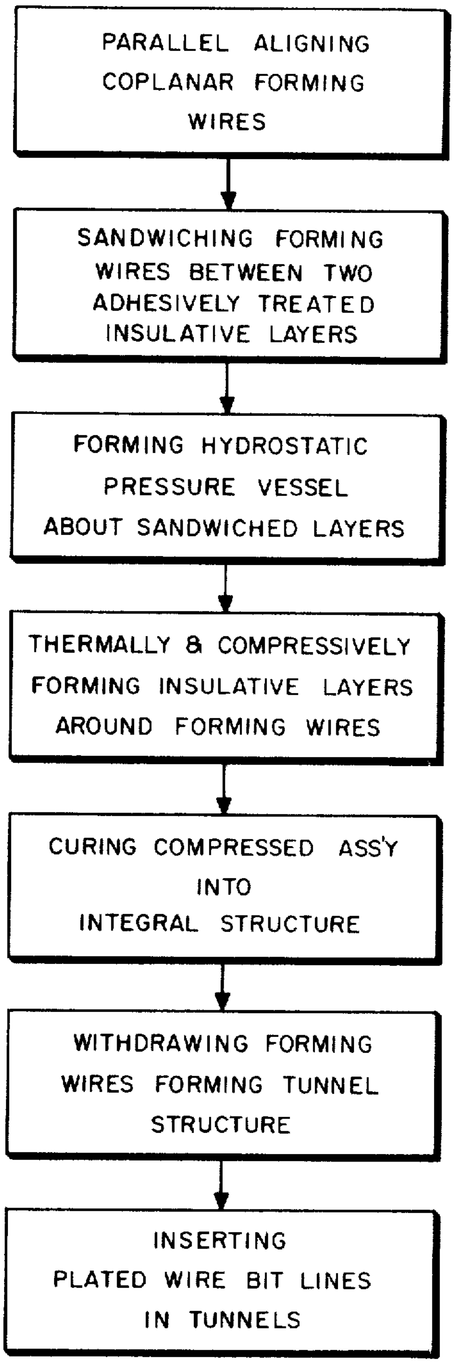
FIG. 4 is a flow diagram illustrating a typical series of steps that may be followed in preparing a plated wire memory array in accordance with the preferred technique of the present invention.
Figure 5:
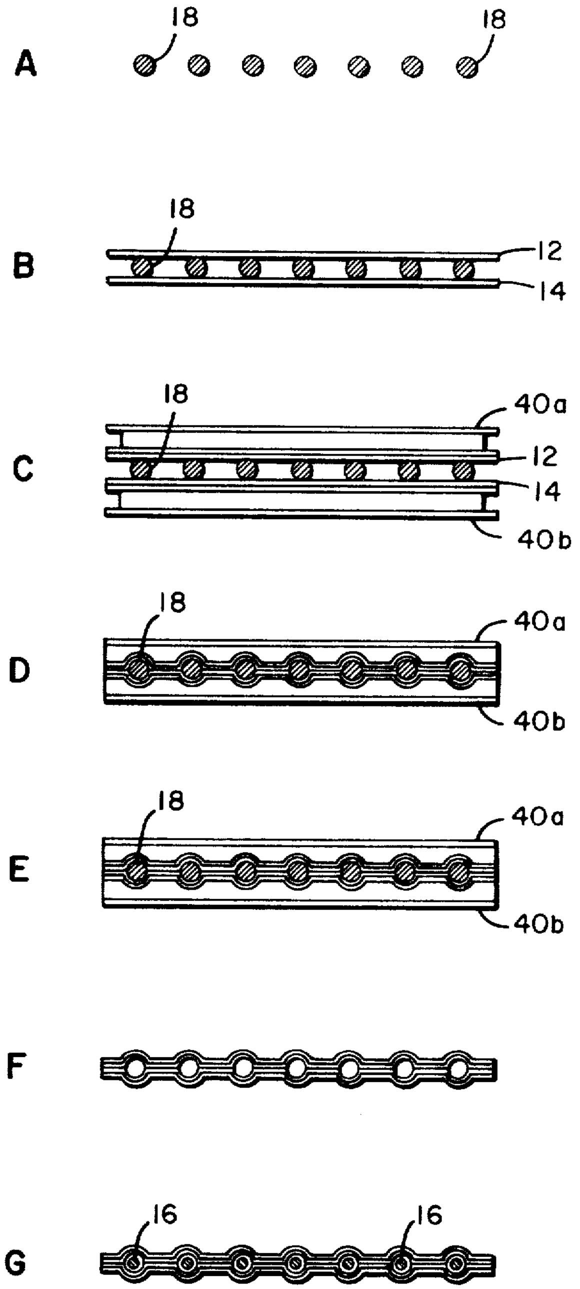
FIG. 5 is a series of views illustrating a typical production plated wire memory array which is under preparation in accordance with the technique of FIG. 4, the various figures illustrating the apparatus progressively in various stages of its production and corresponding to the steps which are indicated adjacently in the flow diagram of FIG. 4.

Discussion of an exemplary method of fabrication of the plated wire memory array 10 of FIG. 1 as proposed by the present invention shall proceed with reference to FIGS. 4 and 5. FIG. 4 illustrates a flow diagram of a series of steps that may be followed in preparing the tunnel structure in accordance with a preferred technique of the present invention. FIG. 6 illustrates progressively the appearance of the product of the present invention during various stages of its fabrication. Each of the illustrations of FIG. 5 are located adjacent to the step during which it is formed, as seen in the flow chart in FIG. 4.

As indicated by the flow chart of FIG. 4, a preferred method of practicing the present invention commences with the parallel aligning of a plurality of spaced-apart coplanar forming wires 18 as noted in Step A. Such forming wires 18 are preferably strung forth and back across a suitable mandrel or jig having two parallel coplanar crossmembers with grooves or pins therein for establishing the desired spacing between the forming wires 18, and, accordingly, the interstitial spaces between adjacent forming wires 18. Forming wires 18 may be Monel or steel piano wires of 0.0070-inch diameter coated with a suitable material to facilitate removal from the to-be-formed tunnel structure.

After aligning the plurality of forming wires 18 in Step A, Step B of the present invention is initiated. Step B involves sandwiching the plurality of forming wires 18 between two printed circuit members 12, 14 having the desired conductive layers on their outside surfaces and an insulating base member, the opposing faces of which have a suitable adhesive affixed thereto. Using the Kapton insulating films 20, 24 of 0.0005-inch thickness, a suitable adhesive may be Hysol Adhesive AS–7–2094. Such adhesive should be evenly distributed over the opposing surfaces of the insulative films 20, 24 of printed circuit members 12, 14 to a thickness in the order of 0.00025–0.00045 inch. The adhesively treated printed circuit members 12, 14 are then brought into contact with the forming wires 18 making sure that the conductors 22 on printed circuit member 12 are orthogonally oriented with respect to the forming wires 18.

The next step, Step C, of the present invention consists of sandwiching the apparatus of Step B above between two hydrostatic pads 40*a*, 40*b*. The sandwiching of the apparatus of Step B above between the hydrostatic pads 40*a*, 40*b* is preferably accomplished with a tooling jig or fixture having accurately aligned spaced-apart opposing parallel faces for establishing parallel spaced-apart faces such as the opposing heatable platens of an hydraulic press.

The next step, Step D, of the present invention involves applying sufficient heat, 325° F. in the present example, to the hydrostatic pads 40*a*, 40*b* to liquefy their associated thermoplastic material 46 (See FIG. 3) and to concurrently apply sufficient pressure thereto to form a pseudo pressure vessel and to cause the printed circuit members 12, 14 to assume the contour of the sandwiched forming wires 18. Under this condition, hydrostatic pads 40*a*, 40*b* and the confining configuration of the forming wires 18 constitute a pseudo pressure vessel, the liquefied thermoplastic material 46 exerting approximately equal hydrostatic pressure upon all surfaces of the sandwiched member of Step B above, having approximately the same effect as an enclosed pressure vessel normally employed in hydrostatic forming operations.

In this step it is particularly important that the conductive members, such as the conductive word lines 22 of printed circuit member 12 and the conductive ground plane 26 of printed circuit member 14, of the sandwiched printed circuit members be of a conductive material providing a grain structure that is substantially parallel to the insulative base. This parallel grain structure will permit a substantially uniform elongation, in the order of 25 percent, as required by this hydroforming step, in contrast to a grain structure perpendicular to the insulative base such as provided by electrodeposited conductive materials.

The next step, Step E, of the present invention involves curing the adhesive materials 34, 36 applied to the opposing faces of the printed circuit members 12, 14 whereby the printed circuit members 12, 14 assume an integral structural form conforming to the forming wires 18 that are sandwiched therebetween. During this step the adhesives 34, 36 that are caused to flow in the gap between the printed circuit members 12, 14 and the forming wires 16 (See FIG. 2) are established into a permanent structural conformation ensuring a smooth internal surface of the so-formed tunnels and a permanent structural mating of the touching opposing faces of the insulative films 20, 24 of the associated printed circuit members 12, 14. This curing step may involve heating the opposing planar faces of the tooling jig of Step D above; however, the application of heat thereto is not to be considered as a limitation to the present invention as many alternative suitable adhesives not requiring the application of heat thereto may be utilized.

the next step, Step F, of the present invention involves withdrawing the forming wires 18 from the so-formed integral structure of Step E above forming the tunnel structure wherein the tunnels are formed by the withdrawn forming wires 18.

The next step, Step G, of the present invention involves inserting the plurality of plated wire bit lines 16 into the tunnels formed by the withdrawal of the forming wires 18 in Step F above. This step may involve the hand insertion of the plated wire bit lines 16 or it may involve a core stringing machine such as that of Fielder U.S. Pat. No. 3,331,126.

What is claimed is:

1. A method of using hydrostatic pressure to form a tunnel structure for a magnetic plated wire array, comprising:
  - sandwiching a plurality of parallel-aligned coplanar spaced-apart forming wires between two insulative layers;
  - hydrostatically compressing said two insulative layers together in their interstitial portions between said forming wires comprising;
    - forming a hydrostatic pressure vessel about said two insulative layers by;
    - sandwiching said two insulative layers between two similar hydrostatic pads;
    - forming said hydrostatic pads of two outer layers and a sandwiched thermoplastic layer;
    - heating said hydrostatic pads;
    - liquifying said thermoplastic layers;
    - compressively forcing said liquefied thermoplastic layers to exert a hydrostatic pressure upon the outer surfaces of said two insulative layers;
    - uniformly elongating said two insulative layers about and along said forming wires;
  - forming an integral structure by the joining of said two interstitial portions while under hydrostatic pressure;
  - forming a tunnel structure from the so-formed integral structure by withdrawing said forming wires.

2. A method of hydrostatically forming a tunnel structure for a magnetic plated wire array, comprising:
  - sandwiching a plurality of parallel-aligned coplanar forming wires between two thermoplastic insulative layers that have conductive members on their outside surfaces and that have their inside opposing surfaces treated with an adhesive;
  - hydrostatically bringing said two insulative layers together in their interstitial portions between said forming wires;
  - compressively causing the adhesive on said two insulative layers to form around said forming wires while under hydrostatic pressure;
  - forming an integral structure by the adhesive joining of said two interstitial portions while under hydrostatic pressure;
  - curing said so-formed integral structure while under hydrostatic pressure;
  - forming a tunnel structure from the so-formed integral structure by withdrawing said forming wires; and,
  - inserting plated wires in the so-formed tunnels of said tunnel structure.

3. The method of claim 2 in which the step of hydrostatically bringing said two insulative layers together in their interstitial portion between said forming wires includes:
  - forming a hydrostatic pressure vessel about said two insulative layers;

hydrostatically exerting a uniform pressure upon the outer surfaces of said two insulative layers; and, uniformly elongating said conductive members on said two insulating layers across said forming wires.

* * * * *